United States Patent [19]

Near et al.

[11] Patent Number: 5,068,877

[45] Date of Patent: Nov. 26, 1991

[54] METHOD FOR SYNCHRONIZING INTERCONNECTED DIGITAL EQUIPMENT

[75] Inventors: Christopher D. Near, Howell; M. Ümit Uyar, Sea Bright, both of N.J.

[73] Assignee: AT&T Bell Laboratories, Murray Hill, N.J.

[21] Appl. No.: 503,205

[22] Filed: Apr. 2, 1990

[51] Int. Cl.$^5$ .............................................. H04L 7/00
[52] U.S. Cl. ...................................... 375/107; 455/51
[58] Field of Search ........................ 375/107; 370/103; 455/51

[56] References Cited

U.S. PATENT DOCUMENTS 4,939,752  7/1990  Literati et al. ...................... 375/107

OTHER PUBLICATIONS

Technical Reference PUB 60110, Dec. 1983, "Digital Synchronization Network Plan", pp. 1–49.
Technical Advisory, TA-NPL-000436, Issue 1, Nov. 1986, "Digital Synchronization Network Plan", pp. 1-1-12-2.
American National Standard for Telecommunications, ANSI T1.101-1987, "Synchronization Interface Standards for . . . ", pp. 9–36.
J. E. Abate et al., IEEE Communications Magazine, Apr. 1989, "AT&T's New Approach to the Synchronization . . . ", pp. 35–45.

Primary Examiner—Benedict V. Safourek
Assistant Examiner—Tesfaldet Bocure
Attorney, Agent, or Firm—Gregory C. Ranieri

[57] ABSTRACT

Optimized synchronization planning and clock distribution for a network of interconnected digital equipment is achieved by designating a network node at the highest stratum level as the master clock node, forming a group of all unassigned nodes connected to the assigned node or nodes, selecting subgroup of all nodes from the group wherein the subgroup includes all nodes having the highest stratum level of the group, limiting the subgroup to the nodes which have a desired characteristic when such nodes are included in the subgroup, determining the synchronization performance of each node in the subgroup according to a predetermined criterion, assigning one node from the subgroup as a clock timing receiver wherein the one node exhibits the best performance for nodes in the subgroup, and iterating the method at the forming step. In order to obtain an optimum synchronization plan, it is desirable to repeat the entire method described above for the complete set of nodes which are capable of being designated as a master clock node. When more than one node is capable of being considered as a master clock node, the synchronization planning method is then completed by computing the network synchronization performance for each synchronization plan related to a different designated master clock node and choosing the synchronization plan which offers the best network synchronization performance as computed above.

5 Claims, 2 Drawing Sheets

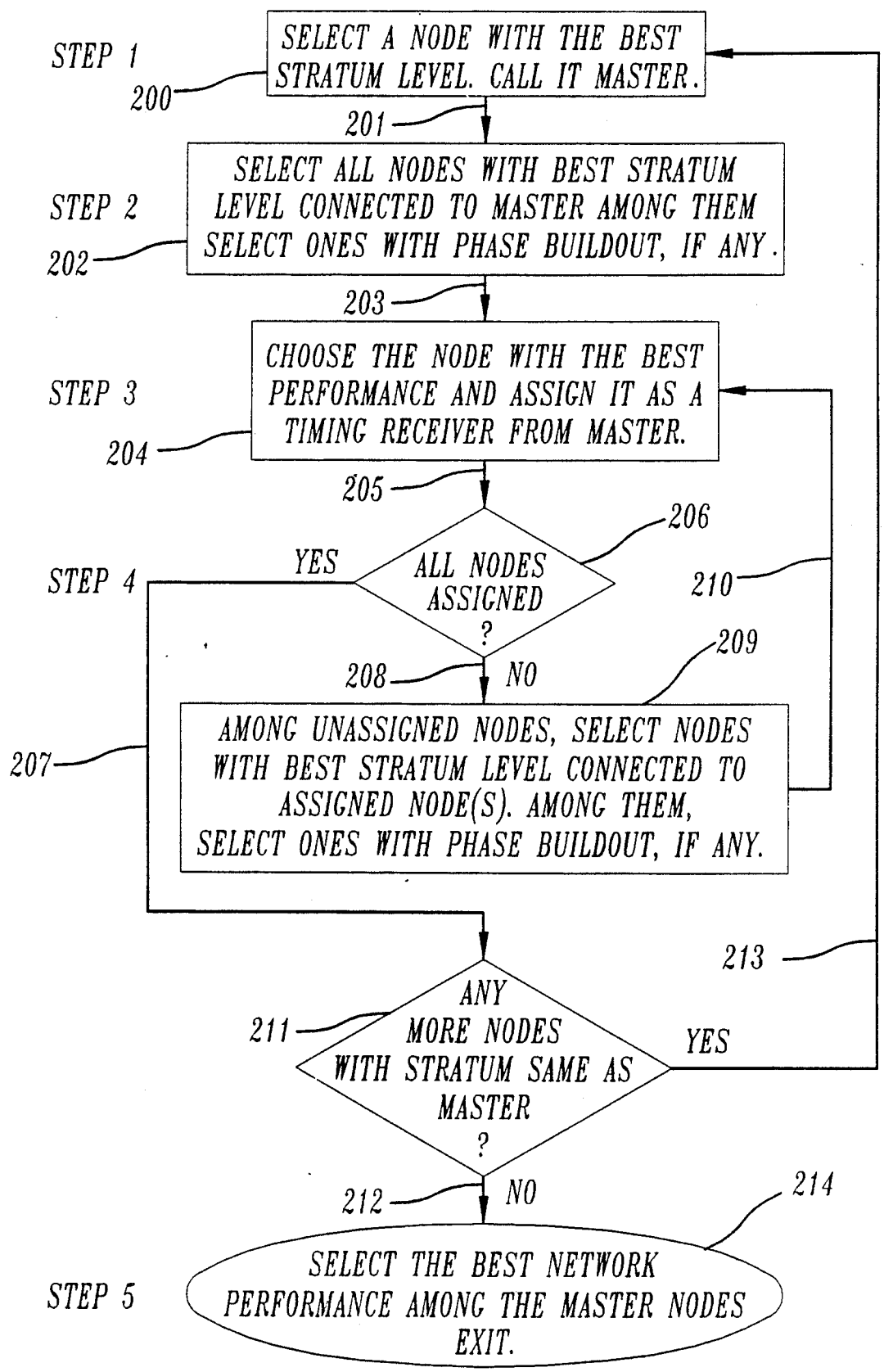

METHOD FOR SYNCHRONIZING INTERCONNECTED DIGITAL EQUIPMENT

TECHNICAL FIELD

This invention relates to synchronization of interconnected digital equipment and, more particularly, a method of distributing clock signals in a digital communication network.

BACKGROUND OF THE INVENTION

Digital communication networks are now appearing in increasingly greater numbers. The digital networks are as complex as a switched network providing national telecommunications or as simple as a private data network having several private branch exchange (PBX) equipments interconnected by a T1.5 line. In the digital network, a master or reference clock provides continuing timing signals to all other clocks in a digital network. This permits all digital equipment on the network to operate from a common time base. Synchronization is made possible by designating one or more master clocks as the common time base and distributing their timing information to all equipment in the network. As a result, all interconnected network equipment are expected to operate at a rate related to the rate of the designated master clock.

Proper synchronization of digital equipment on the network would be nearly impossible without such clock signals and network performance would be seriously degraded at best. A poorly sychronized network would experience severe sychronization slips and error bursts, both of which adversely affect throughput, quality, and delay performance for data and other traffic and services carried by the digital network.

When two digital communication equipments are transmitting information back and forth to each other at different rates, a slower receiving equipment will not be able to keep pace with the faster transmitting equipment. As a result, the receiving equipment must drop or discard some of the information in order to keep up with the current information being received. Depending on equipment characteristics, the speed of one of the equipments will be adjusted or synchronized to the speed of the other so that both equipments appear to be operating from the same clock signal. It should be noted that a speed difference causing a timing loss as small as one second every 300 years is intolerable according to some telecommunication network standards.

Typical problems resulting from timing or synchronization errors can vary from exchange of incorrect or incomplete information to complete blockage and communication failure of the network. Synchronization errors can also propagate downstream through cascaded equipments as a result of a transient timing phase error. For encrypted data systems, loss or slippage of synchronization can adversely affect security of the network by requiring key retransmission. For facsimile transmission on the digital network, synchronization errors can lead to blurred or even illegible images causing the user to generate a need for facsimile retransmission. In digital video services, synchronization errors can cause picture segments to be distored and blanked for periods extending up to several seconds.

When occuring in industry-specific digital networks, the effect of synchronization errors is further magnified. Banking networks may lose monetary transaction information; aviation control networks may be impaired in dealing with the volumes of instantaneous flight information; military and national security can be compromised; hotel, automobile, and airline reservation information may be lost; securities exchange information may include erroneous data; and internal business communications may become flawed, if occurring at all.

To address some of these problem areas, various organizations have attempted to set standards concerning synchronization and clock precision for networks interconnecting digital equipment. See, for example, American National Standard for Telecommunications—Synchronization Interface Standards for Digital Networks, ANSI T1.101-1987. While these standards state the error performance of different clock signals, there is no attempt to teach or suggest the manner in which one should develop and optimize a sychronization plan for an entire network to ensure end-to-end network reliability within the acceptance criteria of the standards.

SUMMARY OF THE INVENTION

Optimized synchronization planning and clock distribution for a network of interconnected digital equipment is achieved by designating a network node at the highest stratum level as the master clock node, forming a group of all unassigned nodes connected to the assigned node or nodes, selecting subgroup of all nodes from the group wherein the subgroup includes all nodes having the highest stratum level of the group, limiting the subgroup to the nodes which have a desired characteristic when such nodes are included in the subgroup, determining the synchronization performance of each node in the subgroup according to a predetermined criterion, assigning one node from the subgroup as a clock timing receiver wherein the one node exhibits the best performance for nodes in the subgroup, and iterating the method at the forming step.

In order to obtain an optimum synchronization plan, it is desirable to repeat the entire method described above for the complete set of nodes which are capable of being designated as a master clock node. When more than one node is capable of being considered as a master clock node, the synchronization planning method is then completed by computing the network synchronization performance for each synchronization plan related to a different designated master clock node and choosing the synchronization plan which offers the best network synchronization performance as computed above.

BRIEF DESCRIPTION OF THE DRAWING

A more complete understanding of the invention may be obtained by reading the following description of a specific illustrative embodiment of the invention in conjunction with the appended drawing in which:

FIG. 2 shows a flowchart representation of a method for developing an optimized synchronization plan in accordance with the principles of the invention.

DETAILED DESCRIPTION

Figure 1:
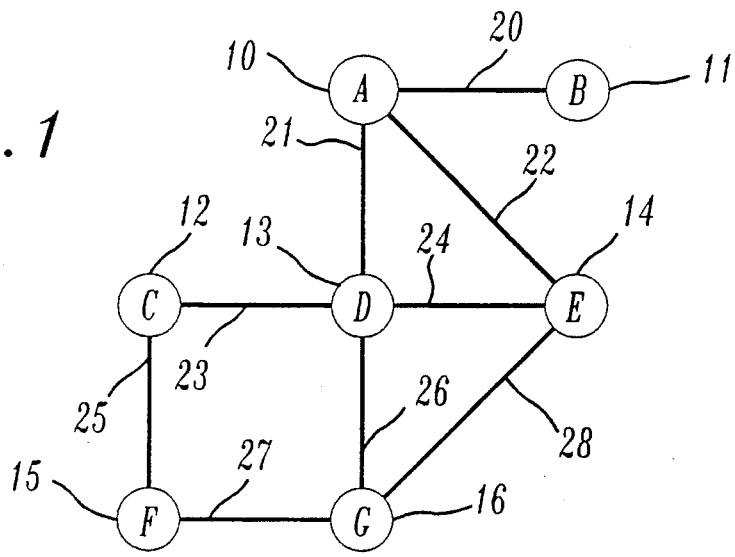
FIG. 1 is a simplified diagram of a network of interconnected digital equipment.

Digital networks are represented as a combination of digital equipment shown as nodes in FIG. 1 interconnected by links shown as lines in FIG. 1. Sychronization performance of a digital network depends on both link and equipment performance. Links are required to transmit timing (clock) information accurately throughout the digital network. Digital equipment is required to receive the timing (clock) information accurately. In order to ensure that all digital equipment in the network are properly synchronized, preparation of a synchronization plan is almost a necessity.

A synchronization plan describes the flow of timing (clock) information throughout a digital network from one or more master timing sources (master clock nodes) to the remaining equipment in the network. As the size of a digital network grows, preparation of a synchronization plan becomes increasingly more difficult because all possible master timing sources and all possible information paths emanating from the master timing sources within the network must be considered. Suboptimal synchronization plans, that is, plans for which synchronization performance is less than optimal such as those developed by prior art adhoc planning methods, are insufficient to ensure maintenance of network synchronization in accordance with the appropriate standard. In digital telecommunication networks, optimum synchronization plans, such as those realized in accordance with the principles of the present invention, can permit the digital network to achieve synchronization performances which exceed the strict timing requirements required by the standards.

In a network of synchronous digital equipment, the purpose of an optimum synchronization plan is to transmit timing information from a master timing source to all equipment in the network in the best possible way. For such a plan, it is necessary to choose one or more master timing sources as a common time base of the network. When properly planned, the network will exhibit a minimum daily time error for all equipment.

In accordance with the principles of this invention, synchronization performance is determined for the network on the basis of a model which incorporates equipment and link performance characteristics. On the basis of this model, it is possible to generate an optimum synchronization plan for the digital network.

In our model, each link in the network has associated therewith a performance parameter specifying the average number of daily transmission errors (dte) measured over that link. Daily transmission errors affect the accurate transfer of timing information from one equipment to another. The link performance parameter is typically a function of the link length and the media type, for example, fiber, satellite, radio, wire and the like.

Every equipment has three parameters representing timing performance of the particular equipment within a network. These parameters are the stratum level of the equipment, its timing reaction to errors in the timing information sent to it, and errors produced by the clock within the particular equipment.

The stratum level refers to four defined levels of clock performance (1 through 4) as defined in standards documents such as the ANSI standard cited above. Smaller stratum level numbers represent more accurate timing performance. Particularly, a stratum 1 clock occupies the highest level in the synchronization hierarchy and is known as the frequency reference (common time base) for the entire synchronization network. It is a primary frequency standard with a minimum accuracy defined to be better than $1 \times 10^{-11}$. A stratum 2 clock occupies the second level in the synchronization hierarchy. This clock must have or must be adjustable to minimum accuracy of $1.6 \times 10^{-8}$. A stratum 3 clock occupies the third level in the synchronization hierarchy and has or must be adjustable to have a minimum accuracy of $4.6 \times 10^{-6}$. A stratum 4 clock occupies the fourth level in the synchronization hierarchy and has or must be adjustable to have a minimum accuracy of $3.2 \times 10^{-5}$. Typically, clocks at stratum levels 1, 2 and 3 utilize phase buildout routines to handle clock interruptions and control residual time error.

The second equipment performance parameter is called time interval error (TIE). TIE is based on the variation of the time delay of a given timing (clock) signal with respect to an ideal timing signal. TIE over a particular period is defined as the difference between the time delay values measured at the end and the beginning of the particular period. TIE is generally expressed in microseconds. This parameter characterizes the ability of equipment to accurately receive timing (clock) information over a link which may be subject to errors.

The third equipment performance parameter is called propagation (prop). Upon receipt of an error in the timing information, some equipment produce errors on its own outgoing communication links. These errors affect synchronization performance of other equipment which receive timing information on the outgoing communication links. When a particular equipment incorporates a phase buildout routine which can mask incoming errors, the equipment does not produce or propagate errors. Propagation effect of a particular equipment is measured as the number of errors (typically ranging from 0 to 2) produced for each incoming error seen by the particular equipment.

A network of interconnected synchronous digital equipment can be represented by a graph of nodes and links like the one depicted in FIG. 1. Nodes A through G designated as elements 10 through 16 in the graph represent the synchronous digital equipment in the network. Links 20 through 28 in the graph represent the interconnection of these equipment or nodes. In this network representation, the digital interconnections between the equipment are any medium of communications such as wire, fiber, satellite, radio and the like.

Each node and link in FIG. 1 are defined by their respective performance parameters.

These parameters are shown in the following tables below:

| NODE | STRATUM | PROPAGATION | TIE | BUILDOUT |
|---|---|---|---|---|
| A | 2 | 0 | 0.07 | Y |
| B | 2 | 0 | 0.3 | Y |
| C | 4 | 2 | 250 | N |
| D | 3 | 0 | 0.07 | Y |
| E | 3 | 0 | 0.65 | Y |
| F | 3 | 0 | 1.0 | Y |
| G | 4 | 1 | 100 | N | and

| LINK | DTE |
|---|---|
| 20(AB) | 10 |
| 21(AD) | 5 |
| 22(AE) | 20 |
| 23(CD) | 4 |
| 24(DE) | 3 |
| 25(CF) | 3 |

| | |
|---|---|
| -continued | |
| 26(DG) | 7 |
| 27(FG) | 4 |
| 28(EG) | 12 |

Figure 3:
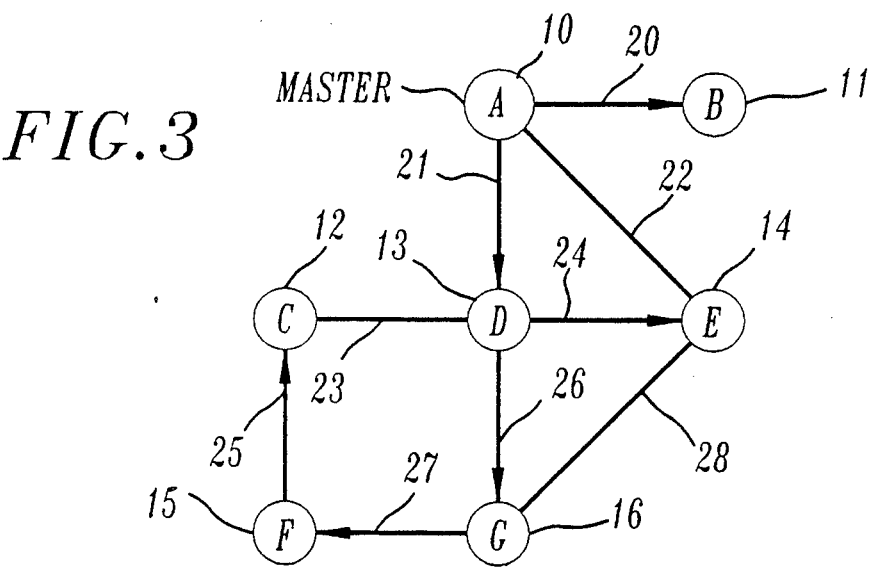
FIGS. 3 and 4 show synchronization plans for the network in FIG. 1 developed in accordance with the principles of the invention with master clocks assigned as nodes A and B, respectively.
Figure 4:
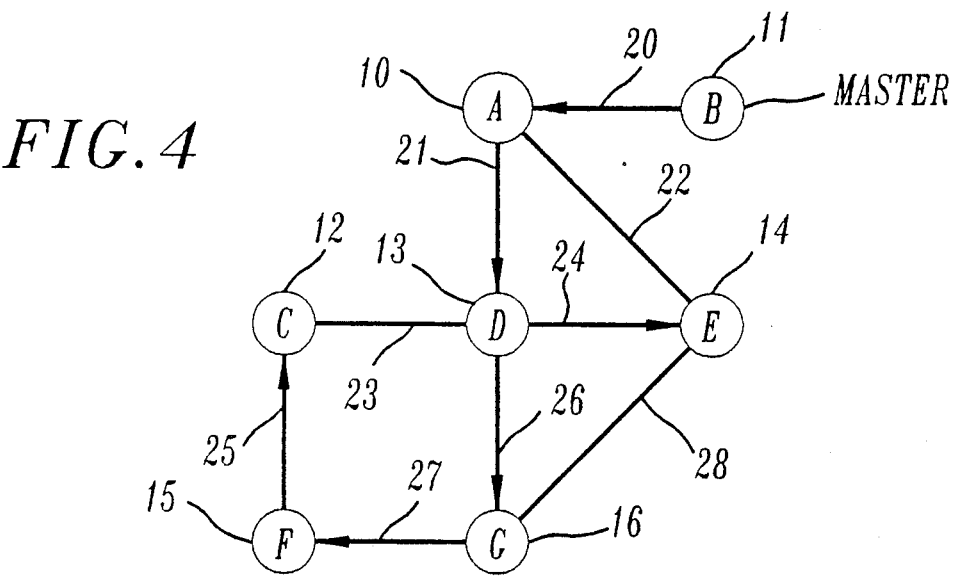

With the network represented as shown in FIG. 1, including the performance parameters of nodes and links, the inventive method determines the master timing source for the digital network and develops an optimum synchronization plan. The master timing source is chosen to operate on its own time base. As the inventive method is applied, flow of timing information from the master timing source to other equipment is represented by arrows on the links as shown in FIGS. 3 and 4. Arrows are shown pointing from the timing source equipment to the timing receiving equipment.

A more detailed explanation of our inventive method for synchronizing interconnected digital equipment proceeds as shown in FIG. 2.

In step 1, instruction box 200 calls for designation of a master clock node. If there are stratum level 1 nodes in the network, then assign all stratum 1 nodes as master nodes. Master nodes which generate the common time base do not have a timing assignment. If there are no stratum level 1 nodes, then select the node with the best stratum level between levels 2 through 4. If there is more than one node having the highest stratum level between levels 2 through 4, then choose one of them arbitrarily and call it the master node. The master node is now said to be assigned. Daily time error and daily output error, that is, number of errors produced by the node, of the master node are considered zero. After instruction box 200, control is passed to step 2 at instruction box 202 via line 201.

In step 2, instruction box 202 calls for forming a group of all unassigned nodes connected to the assigned node, selecting a subgroup of all nodes from the group wherein the subgroup includes all nodes having the highest stratum level of the group and limiting the subgroup to nodes which have a common desired characteristic. This step requires one to select a subset of nodes which are connected to a master node and select the best stratum level among them. If more than one node has the best stratum level, select all of them. If any of the nodes in the chosen subset produce synchronization impairments which affect downstream clocks (i.e., the particular equipment does not incorporate phase buildout), these nodes are to be removed from the chosen subset. If all the nodes in the chosen subset produce impairments, the chosen subset is left intact. Control is transferred from instruction box 202 to instruction box 204 via line 203.

In step 3, instruction box 204 calls for determining the synchronization performance of each node in the subgroup according to a predetermined performance criterion and assigning one node from the subgroup as a clock timing receiver wherein the newly assigned node exhibits the best performance for nodes in the subgroup. At the previous step, a subset of nodes was chosen as possible receiving nodes. Based on whether the nodes produce impairments, that is, whether they do not have phase buildout, the following condition is defined for each node within the chosen subset: $COND\_1 = TRUE$, if a receiving node within the chosen subset has phase buildout; $COND\_1 = FALSE$, otherwise.

Similarly, for each assigned node connected to a node within the chosen subset (i.e., the possible sources of timing), the following condition is defined: $COND\_2 = TRUE$, if a possible source of timing has phase buildout; $COND\_2 = FALSE$, otherwise.

For the chosen nodes and the respective possible sources of timing for which $COND\_1$ and $COND\_2$ are true, daily time error of the chosen nodes is calculated as follows:

$$daily\_time\_error(receiver) = [dte + daily\_output\_error(source)] \times TIE(receiver) + daily\_time\_error(source).$$

For the chosen nodes for which $COND\_1$ is true and the respective possible sources of timing with $COND\_2$ is false, daily time error of the chosen nodes is calculated as follows:

$$daily\_time\_error(receiver) = [dte + daily\_output\_error(source)] \times TIE(receiver).$$

After performing these computations, it is possible to choose the node with the lowest daily time error over the links from an assigned node. This node is assigned as a timing receiver. It will receive timing from an assigned node, such as the master, over the link between them which results in the lowest daily timing error. Since the chosen node has now been assigned timing, an arrow is placed on the link pointing from the source of timing to the chosen node for which timing has been assigned. Control is passed from instruction box 204 to decision box 206 via line 205.

If $COND\_1$ is false for the chosen nodes, then calculate the daily output errors produced by the chosen node as follows:

$$daily\_output\_error(receiver) = [dte + daily\_output\_error(source)] \times prop(receiver).$$

After this computation, it is possible to choose the node with the lowest daily output error over the links from an assigned node and assign that node as a timing receiver. Based on the respective possible timing sources for the node assigned as the timing receiver, one can calculate the daily time error as in the first equation, if $COND\_2$ is true, or in the second equation, if $COND\_2$ is false.

The node assigned as timing receiver will receive timing from an assigned node, such as the master, over the link between them which results in the lowest daily timing error. An arrow is placed on the link pointing from the source of timing to the timing assigned chosen node. Control is transferred from instruction box 204 to decision box 206 via line 205.

In step 4, decision box 206 calls for determining whether all nodes have been assigned as timing receivers. If all nodes have been assigned then control is transferred to decision box 211 via line 207. If all nodes have not been assigned, then control is transferred to instruction box 209 via line 208. If there are nodes which have not been assigned, then it is necessary to select the subset of nodes connected to nodes which already have assigned timing sources and select the best stratum level among them. This step is similar to step 2 performed at instruction box 202. If more than one node has the best stratum level, all are selected. If any of the nodes in the chosen subset produces impairments which affect downstream clocks (i.e., do not incorporate phase buildout), these nodes are removed from the chosen subset. If all the nodes in the chosen subset produce impairments, do not remove any nodes from the chosen subset. Control is transferred as described above.

In decision box 211, it is necessary to determine whether there are more nodes in the network with the same stratum level as the newly assigned master node. If such additional nodes exist, then control is transferred to instruction box 200 via line 213. If no such additional nodes exist, then control is transferred to instruction 214 via line 212. When control is transferred from decision box 211 to instruction box 200, it is necessary to select a different node to be assigned as the master node.

In step 5, instruction 214 calls for computing the network synchronization performance for each synchronization plan related to a different designated master clock node and, thereafter, choosing the synchronization plan which offers the best computed network synchronization performance. After considering all the network synchronization plans with the various nodes as possible master, it is necessary to calculate the network synchronization performance. This performance is calculated as follows:

$$net\_sync\_perf = \sum_{nodes} f(daily\_time\_error(node), number\_of\_links(node))$$

where $\Sigma$ represents the summation of the synchronization performance over all the nodes in the network. After computing the network synchronization performance, it is possible to choose the network synchronization plan with the best (i.e., the lowest) network synchronization performance. The timing master for the network will be the master node indicated in that synchronization plan. The flow of synchronization timing information through the network is indicated by each timing assignment (arrow direction).

EXAMPLE

To illustrate the above-described method, the telecommunications network of FIG. 1 is considered. In this example, there are seven digital equipment named A through G that are interconnected as shown in FIG. 1. The performance parameters of each equipment and link have been indicated in the tables above.

The method to find the optimal synchronization plan proceeds through several iterations of the method. Each iteration is described in detail below. The number of iterations will be equal to the number of nodes receiving timing. The total number of iterations increases linearly with the number of possible masters.

Iteration 1: for Master = Node A

Step 1. The best stratum level of all nodes in the network is 2. There are two nodes with the best stratum levels, namely nodes A and B. Initially, select node A as the master node.

Step 2. Nodes B, D, and E are connected to node A. Among these three nodes, node B has the best stratum level. Therefore, node B is selected as the best node among B, D, and E.

Step 3. Since there is only one node selected at Step 3, and since there is only one link between A and B, node B is assigned timing from node A over link AB. The daily timing error of node B is 3 microseconds and its daily output errors is 0. Therefore, nodes A and B are assigned timing.

Step 4. Nodes D and E are the only unassigned nodes connected to the timing assigned nodes A and B. Since both nodes D and E have the same stratum level, they are both selected as the best nodes. Both nodes D and E have phase buildout and do not produce impairments, so they remain in the chosen subset.

Iteration 2: for Master = Node A

Step 3. Calculate the daily time error performance of node D over link AD and of node E over link AE as follows:

Node $D$ daily_time_error $= (5+0) \times 0.07 = 0.35$

Node $E$ daily_time_error $= (20+0) \times 0.65 = 13.0$

Since the performance of node D is better than node E, node D is assigned the timing source node A over link AD. The daily number of output errors from node D is zero. Therefore, nodes A, B, and D are assigned timing.

Step 4. Nodes C, E, and G are the only unassigned nodes connected to the timing assigned nodes A, B, and D. Node E has the best stratum level and is chosen as the best node.

Iteration 3: for Master = Node A

Step 3. Calculate the daily time error performance of node E over links AE and DE as follows:

Link $AE$ daily_time_error $= (20+0) \times 0.65 - 13.0$

Link $DE$ daily_time_error $= (3+0) \times 0.65 + 0.35 = 2.3$

Since the performance of node E is better when timing comes from node D over link DE than from node A over link AE, node E is assigned the timing source node D over link DE. The daily number of output errors from node E is 0. Therefore, nodes A, B, D, and E are assigned timing.

Step 4. Nodes C and G are the only unassigned nodes connected to the timing assigned nodes A, B, D, and E. They both have the same stratum level and, therefore, are both chosen. Both nodes C and G do not incorporate phase buildout and produce errors, thus they are both chosen.

Iteration 4: for Master = Node A

Step 3. Since both chosen nodes produce impairments, the daily output errors of the nodes are calculated. Calculate the daily output errors of node C over link CD and node G over links DG and EG as follows:

Node $C$, link $CD$ daily_output_error $= (4+0) \times 2 = 8$

Node $G$, Link $DG$ daily_output_error $= (7+0) \times 1 = 7$

Node $G$, Link $EG$ daily_output_error $= (12+0) \times 1 = 12$

Since the number of daily output errors is lower for node G than node C, node G will be assigned timing. Calculate the daily time error of node G over links DG and EG as follows:

Link
    DG daily_time_error=(7+0)×100+0.35=700.35

Link
    EG daily_time_error=(12+0)×100+2.3=1202.3

Since the performance of node G is better when timing comes from node D over link DG than from node E over link EG, node G is assigned the timing source node D over link DG. The daily number of output errors from node G is 7. Therefore, nodes A, B, C, E, and G are assigned timing.

Step 4. Nodes C and F are connected to the assigned nodes D and G. Among these two nodes, node F has the best stratum level. Therefore, node F is selected as the best node.

Iteration 5: for Master=Node A

Step 3. Since there is only one node selected at Step 2, and since there is only one link between G and F, node F is assigned timing from node G over link FG. The daily timing error of node F is given by
    Node F daily_time_error=(4+7)×1.0=11.0

The daily number of output errors is 0. Therefore, all nodes except C are assigned timing.

Step 4. Since node C is the only node without a timing assignment, it is chosen.

Iteration 6: for Master=Node A

Step 3. Calculate the daily time error performance of Node C over links CD and CF as follows:

Link
    CD daily_time_error=(4+0)×250+3.35=1000.35

Link
    CF daily_time_error=(3+0)×250+11.0=761.0

Since the performance of node C is better when timing comes from node F over link CF than from node D over link CD, node C is assigned the timing source node F over link CF.

Step 4. All nodes are assigned timing. There is one node, node B, with the same stratum level as node A, which has not been chosen as a possible master node. Go to step 1 and choose node B as the master node.

Iterations for Master=Node B

There will be a total of six (6) iterations for Master=node B. The result of these iterations is shown in FIG. 4.

Step 5. When the procedure has been repeated with node B as the master node, all nodes with the best stratum level will have been chosen as a possible master node.

The computation results which are used to develop the synchronization plans for the digital network of FIG. 1 as shown in FIGS. 3 and 4 are shown in the following tables. The first table is developed using node A as the master; the second table is developed using node B as the master.

| | NODE | DAILY TIME ERROR | DAILY OUTPUT ERROR |
|---|---|---|---|
| | A | — | — |
| | B | 3.0 | 0 |
| | C | 761.0 | 6 |
| | D | 0.35 | 0 |
| | E | 2.3 | 0 |
| | F | 11.0 | 0 |
| | G | 700.35 | 7 |
| and | | | |
| | A | 0.7 | 0 |
| | B | — | — |
| | C | 761.7 | 6 |
| | D | 1.05 | 0 |
| | E | 3.0 | 0 |
| | F | 11.7 | 0 |
| | G | 701.05 | 7 |

Step 5 of the method is used to compare the network synchronization performance of the two possible plans (one with node A as the timing master and one with node B as the timing master). The network performance for the plan using node A as the timing master is better than the one using node B. Thus, the first synchronization plan, with A being the timing master, will be the synchronization plan for the network.

We claim:

1. A method for planning synchronization clock distribution for a network of interconnected digital equipment wherein each digital equipment is represented as a node interconnected to other nodes by links, the digital equipment characterized by a set of equipment performance parameters and each link characterized by at least one link performance parameter, the method comprising assigning one node at the highest stratum level as the master clock node, forming a group of all unassigned nodes connected to the assigned node or nodes, selecting a subgroup of all nodes from the group wherein the subgroup includes all nodes having stratum levels which are equal or highest within the group, limiting the subgroup to nodes which have a desired characteristic when such nodes are included in the subgroup, determining synchronization performance of each node in the subgroup according to a predetermined criterion, assigning one node from the subgroup as a clock timing receiver wherein the one node exhibits synchronization performance better than synchronization performance for all other nodes in the subgroup, and iterating the method at the forming step until all nodes are assigned as timing receivers.

2. The method as defined in claim 1 further comprising assigning a different node having a stratum level equal to the stratum level of the one node as the master clock node and performing the iterating step.

3. The method as defined in claim 2 further comprising computing network synchronization performance for each synchronization plan related to a different assigned master clock node and choosing the synchronization plan which offers an optimum network synchronization performance.

4. The method as defined in claim 1 comprising indicating a timing flow along a link into the clock timing receiver after the receiver has been assigned.

5. The method as defined in claim 1 wherein the desired characteristic includes the existence of phase buildout for the equipment associated with the node.

* * * * *